(12) United States Patent
Dropps et al.

(10) Patent No.: US 7,843,846 B1
(45) Date of Patent: Nov. 30, 2010

(54) METHOD AND SYSTEM FOR PROCESSING NETWORK INFORMATION

(75) Inventors: Frank R. Dropps, Maple Grove, MN (US); Thomas R. Prohofsky, Edina, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 611 days.

(21) Appl. No.: 11/522,672

(22) Filed: Sep. 18, 2006

(51) Int. Cl.
*G08C 15/00* (2006.01)
(52) U.S. Cl. .................. 370/252; 370/503; 370/545
(58) Field of Classification Search .................. None
See application file for complete search history.

(56) References Cited

U.S. PATENT DOCUMENTS

| | | | |
|---|---|---|---|
| 5,062,105 A * | 10/1991 | McKnight et al. ........... 370/538 |
| 6,091,725 A * | 7/2000 | Cheriton et al. ............ 370/392 |
| 6,317,415 B1 * | 11/2001 | Darnell et al. .............. 370/230 |
| 6,879,526 B2 * | 4/2005 | Lynch et al. ............ 365/189.12 |
| 2002/0118640 A1 * | 8/2002 | Oberman et al. ............. 370/230 |
| 2002/0118692 A1 * | 8/2002 | Oberman et al. ............. 370/419 |
| 2003/0110344 A1 * | 6/2003 | Szczepanek et al. ........ 711/100 |
| 2003/0198251 A1 * | 10/2003 | Black et al. ................. 370/462 |
| 2004/0085994 A1 * | 5/2004 | Warren et al. ............... 370/462 |
| 2004/0141486 A1 * | 7/2004 | Suri et al. ................... 370/338 |
| 2005/0053022 A1 * | 3/2005 | Zettwoch ................... 370/299 |
| 2005/0271073 A1 * | 12/2005 | Johnsen et al. ............. 370/428 |

OTHER PUBLICATIONS

"Fibre Channel Arbitrated Loop (FC-AL-2) Rev 6.1", Cover Page and p. 75, Feb. 16, 1998, American National Standard for Information Technology.

* cited by examiner

*Primary Examiner*—Chirag G Shah
*Assistant Examiner*—Daniel Mitchell
(74) *Attorney, Agent, or Firm*—Klein, O'Neill & Singh, LLP

(57) ABSTRACT

Method and system for routing network information using a switch element coupled to a network link is provided. The switch element includes a programmable control system to configure the switch element to operate in a default mode, an immediate mode, a threshold mode or an interleave mode; and during the immediate mode, a transmit port inserts at least a fill word with at least a unique character when network information is not available, and transmits network information as soon as it is available. The method includes, determining if an immediate mode is enabled; transmitting at least a fill word with a unique character to a receive port, if network information is unavailable and transmitting network information if the immediate mode is enabled and network information is available.

33 Claims, 14 Drawing Sheets

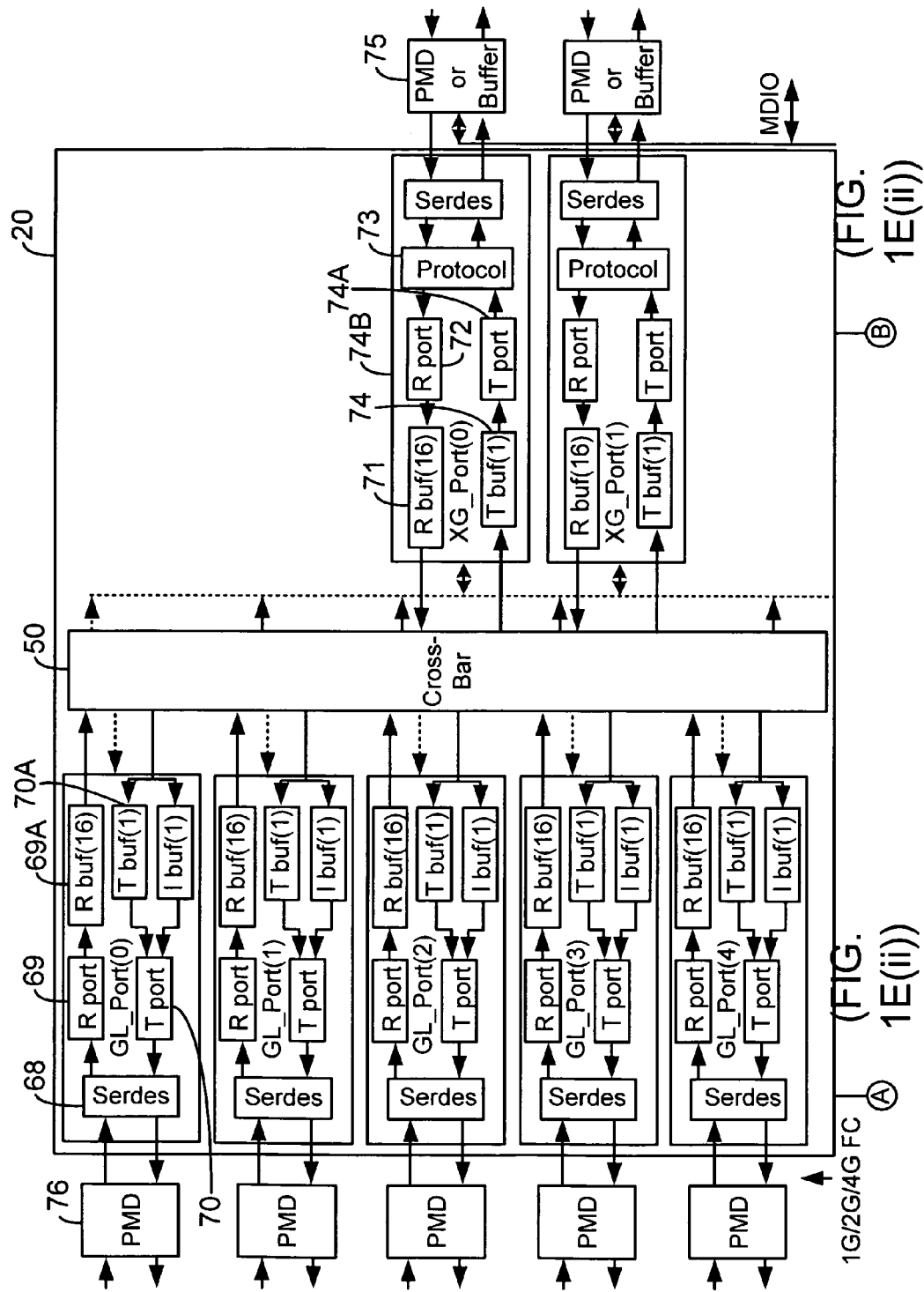

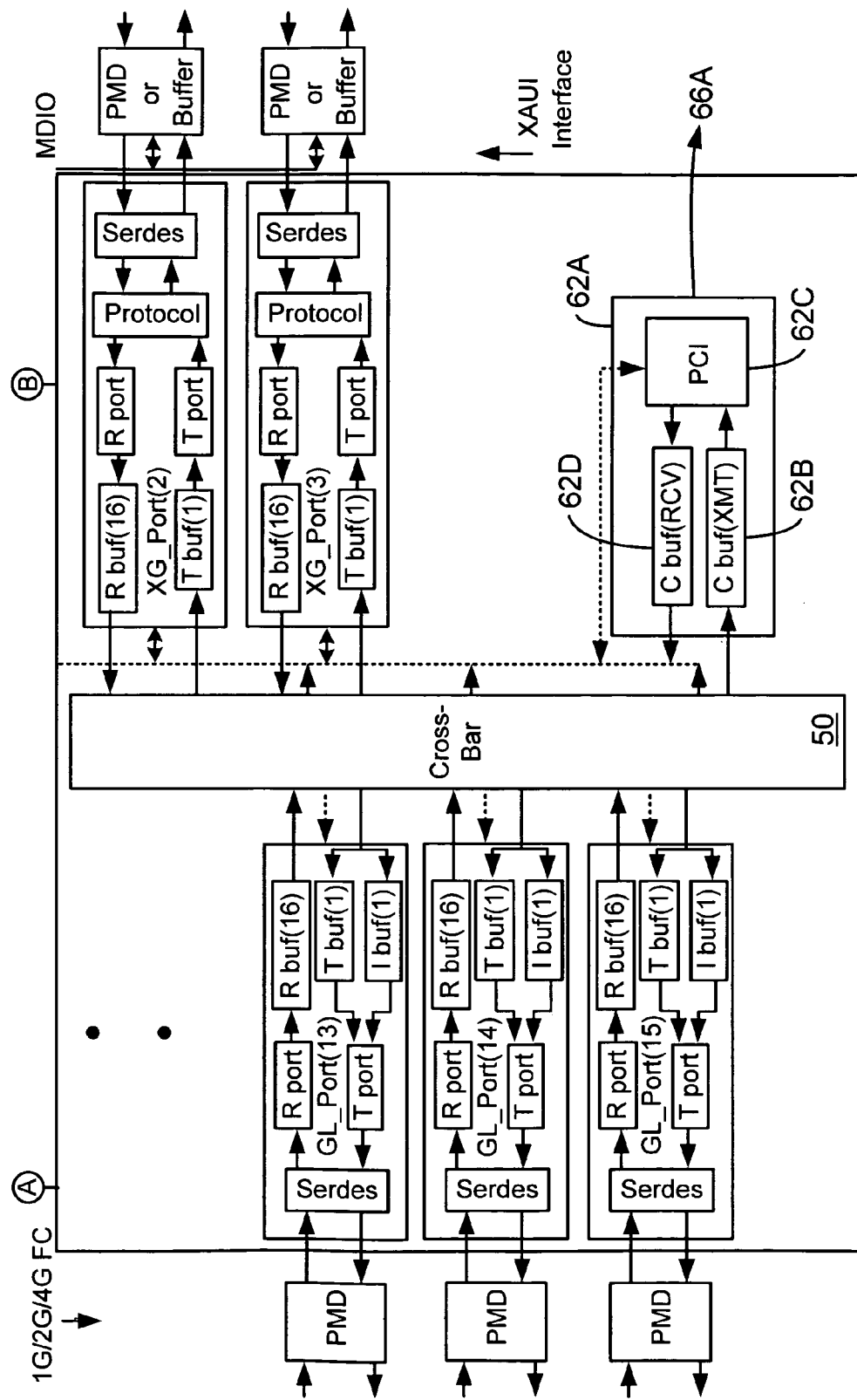
FIG. 1E(ii)

METHOD AND SYSTEM FOR PROCESSING NETWORK INFORMATION

CROSS REFERENCE TO RELATED APPLICATIONS

This patent application is related to U.S. patent application, entitled "Method and System for Programmable Data Dependant Network Routing", Ser. No. 10/894,627, filed on Jul. 20, 2004, the disclosure of which is incorporated herein by reference in its entirety.

BACKGROUND

1. Field of the Invention

The present invention relates to network systems, and more particularly, to processing network information (i.e. frames/packet).

2. Background of the Invention

Network systems are commonly used to move network information (may also be referred to interchangeably, as frames/packets/commands) between computing systems (for example, servers) and network devices (for example, storage systems). Various hardware/software components are used to implement network communication, including network switches.

A network switch is typically a multi-port device where each port manages a point-to-point connection between itself and its attached system. Each port can be attached to a server, peripheral, input/output subsystem, bridge, hub, router, or even another switch. A switch receives messages from one port and routes it to another port.

Typically, when a switch receives a data packet at a receive port, it parses the packet and then routes it via a crossbar and transmit port. The receive port/transmit port are attached to physical links, which may be copper, optical or any other media. The rate at which the physical links can receive or transmit data (also referred to as link-rate) may vary. For example, link-rates may be 1 gigabits per second (may be referred to as "1G" or "Gbps"), 2G, 2.5G, 3G, 4G, 5G, 6G, 8G, 10G or any other rate.

If the link-rate of a switch transmit (egress) port is faster than the link rate of a receive (ingress) port, data packets may get backed up in a receive buffer. The transmit port may have to wait until a portion of the packet is received before transmitting the packet. For example, if a receive port receives packets at a link-rate of 1G and a transmit port transmits at a link-rate of 2G, the transmit port has to wait until half of the incoming packet is received before it can transmit any part of that packet. This may increase latency and result in overall performance degradation.

Therefore, there is a need to efficiently process network information with reduced latency.

SUMMARY OF THE INVENTION

In one aspect of the present invention, a switch element coupled to a network link for routing network information is provided. The switch element includes a programmable control system to configure the switch element to operate in a default mode, an immediate mode, a threshold mode or an interleave mode; and during the immediate mode, a transmit port inserts at least a fill word with at least a unique character when network information is not available, and transmits network information as soon as it is available.

In another aspect of the present invention, a method for transmitting network information via a switch element coupled to a network link is provided. The method includes determining if an immediate mode is enabled; transmitting at least a fill word with a unique character to a receive port, if network information is unavailable and (a) if a threshold mode is disabled; or (b) if a threshold condition is not met when the threshold mode is enabled; and transmitting network information if the immediate mode is enabled and network information is available; and the threshold mode is either disabled or if a threshold condition is not met.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1E [1E(i)-1E(ii)] shows a block diagram of a switch element that routes a data packet, according to one aspect of the present invention;

DETAILED DESCRIPTION

Definitions

Figure 1A:
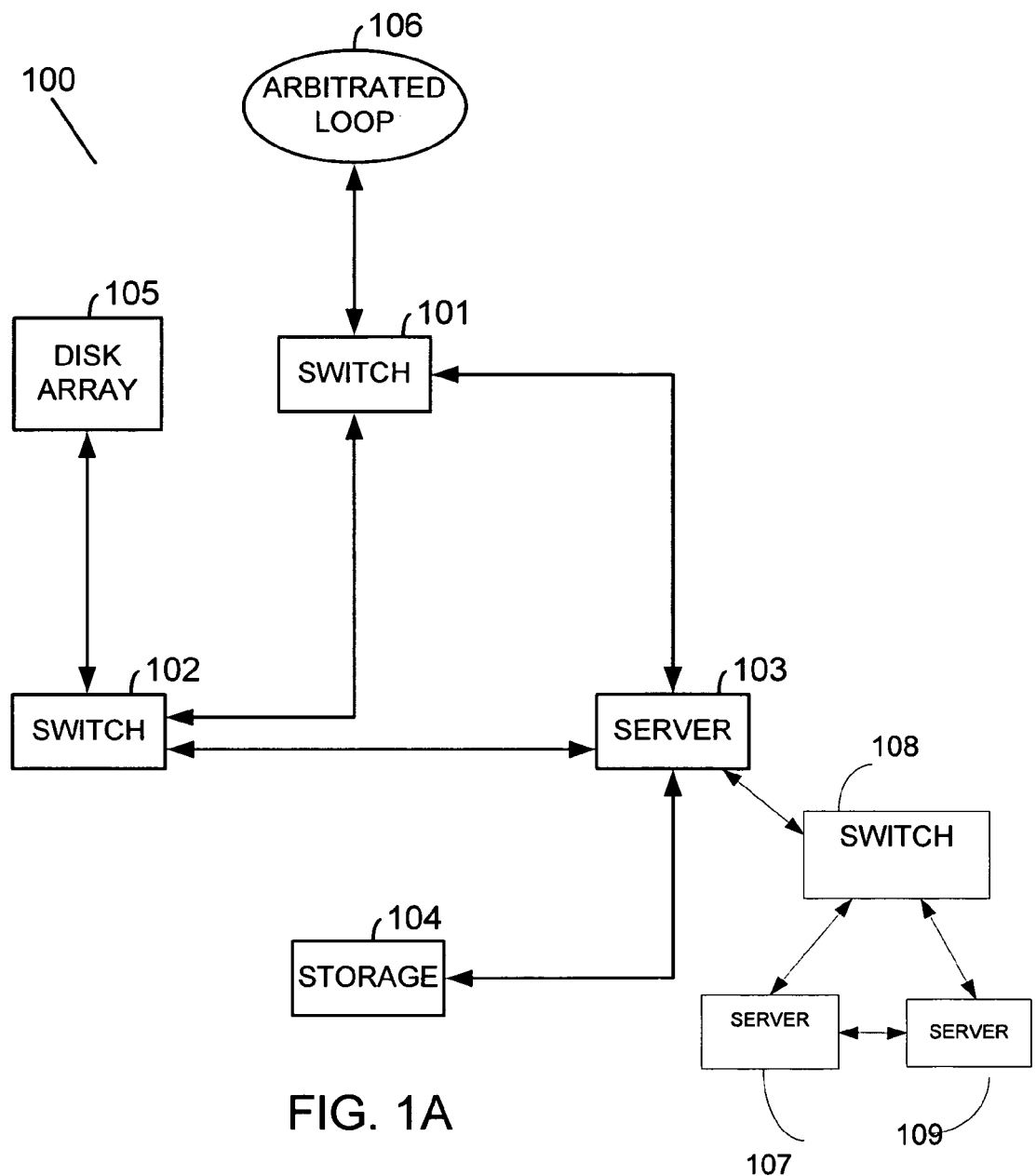
FIG. 1A shows an example of a network system used according to one aspect of the present invention.

The following definitions are provided for convenience as they are typically (but not exclusively) used in the Fibre Channel, InfiniBand, SAS and general networking environment, implementing the various adaptive aspects of the present invention.

"Data Word": A network packet data word used for network communication.

"Fabric": The structure or organization of a group of switches, target and host devices.

"Fill Word": A link primitive that is inserted between data packets or part of data packets. A Fill Word may be any size, for example, 4 bytes.

"K" character: A unique identifier that may be used to identify a Fill Word.

"Switch": A device that facilities network communication conforming to the Fibre Channel, InfiniBand, SAS and other switch standards/protocols.

"Link-Rate": The rate at which a physical link receives or transmits data.

To facilitate an understanding of the various aspects of the present invention, the general architecture and operation of a network system and a switch element will be described. The specific architecture and operation will then be described with reference to the general architecture.

Various network standard and protocols may be used to enable network communications, including Fibre Channel, InfiniBand, Serial Attached SCSI (SCSI) and others. These standards support different link rates and following provides a brief introduction to some of these standards.

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop.

The Fibre Channel Fabric topology attaches host systems directly to a Fabric, which are then connected to multiple devices. The Fibre Channel Fabric topology allows several media types to be interconnected.

InfiniBand is a switched fabric interconnect standard for servers. The technology is deployed for server clusters/enterprise data centers ranging from two to thousands of nodes. The InfiniBand standard is published by the InfiniBand Trade Association, and is incorporated herein by reference in its entirety.

Serial Attached SCSI (SAS) is a computer bus technology primarily designed for transfer of data to and from devices like hard-disks, CD-ROM and so on. SAS is a serial communication protocol for direct attached storage devices. It is designed as a replacement for parallel SCSI, allowing for high speed data transfers than previously available, and is backwards-compatible with the serial ATA (SATA) standard. Though SAS uses serial communication instead of the parallel communication found in traditional SCSI devices, it still uses SCSI commands for interacting with SAS end devices. SAS protocol is developed and maintained by T10 committee and is incorporated herein by reference in its entirety.

Network System:

FIG. 1A is an example of a network system 100 implementing the adaptive aspects of the present invention. System 100 includes plural devices that are interconnected. Each device includes one or more ports that allow them to be connected to other devices.

Server 103 is coupled to switch 108 that are coupled to servers 107 and 109. Switch 102 is coupled to a disk array (or any other storage system) 105 and to server 103. Switch 102 is also coupled to switch 101 that is coupled to an arbitrated loop 106, if the network supports Fibre Channel.

The devices of FIG. 1A are operationally coupled via "links" or "paths". A path may be established between server 103 and storage 104. A packet-switched path may be established using multiple links, e.g. server 103 may establish a path with disk array 105 through switch 102.

Figure 1B:
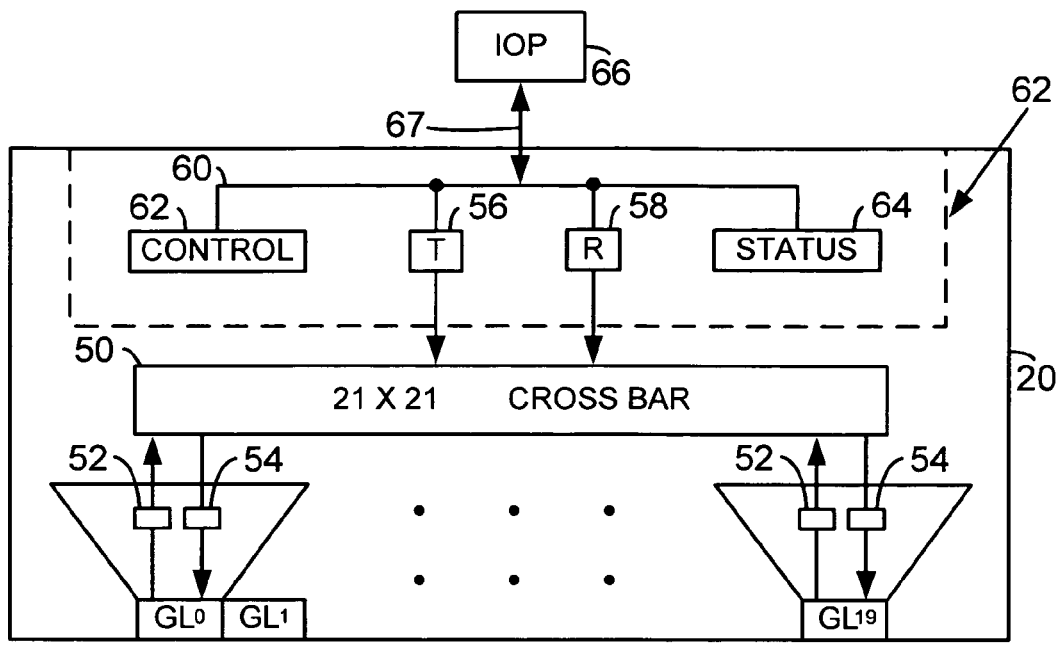
FIG. 1B shows an example of a Fibre Channel switch element, according to one aspect of the present invention.

Switch Element:

FIG. 1B is a block diagram of a 20-port ASIC element that may be used in an InfiniBand and/or SAS environment, according to one aspect of the present invention. FIG. 1B provides the general architecture of a 20-Channel switch chassis using the 20-port Fabric element.

Fabric element includes ASIC 20 with non-blocking Fibre Channel class 2 (connectionless, acknowledged) service and class 3 (connectionless, unacknowledged) service between any ports. It is noteworthy that ASIC 20 may also be designed for class 1 (connection-oriented) service, within the scope and operation of the present invention as described herein.

The Fabric element of the present invention is presently implemented as a single CMOS ASIC, and for this reason the term "Fabric element" and ASIC are used interchangeably to refer to the preferred embodiments in this specification. Although FIG. 1B shows 20 ports, the present invention does not depend on any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in Fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 is comprised of transmit and receive connections to switch crossbar 50. Within each port, one connection is through receive port 52, which has a buffer that receives and temporarily holds a data packet during a routing operation. The other connection is through a transmit port 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a Fabric controller, which may be external to ASIC 20.

In the preferred embodiments of switch chassis described herein, the Fabric controller is a firmware-programmed microprocessor, also referred to as the input/output processor ("IOP"). As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink data packets.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

Figure 1C:
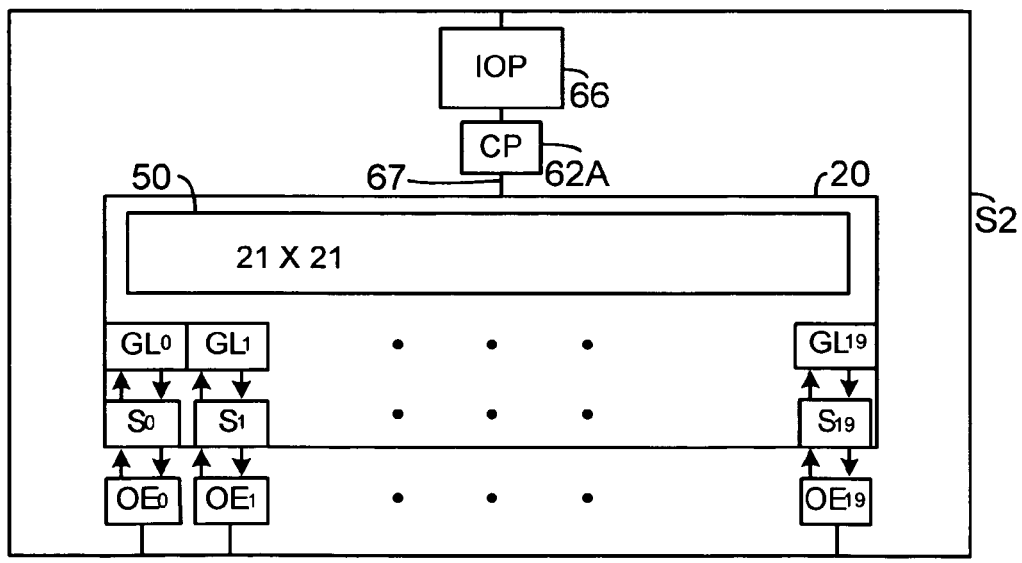
FIG. 1C shows a block diagram of a 20-Channel switch chassis, according to one aspect of the present invention.

FIG. 1C shows a 20-Channel switch chassis S2 using ASIC 20 and IOP 66 with control registers (similar to control register 62, FIG. 1B) in control port 62A. IOP 66 in FIG. 1C is shown as a part of a switch chassis utilizing one or more of ASIC 20. S2 will also include other elements, for example, a power supply (not shown). The 20 GL Ports correspond to Channels C0-C19.

Each GL_Port has a serial/deserializer (SERDES) designated as S0-S19. Ideally, the SERDES functions are implemented on ASIC 20 for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

Each GL_Port may have an optical-electric converter, designated as OE0-OE19 connected with its SERDES through serial lines, for providing Fibre optic input/output connections, as is well known in the high performance switch design. The converters connect to switch Channels C0-C19. It is noteworthy that the ports can connect through copper paths or other means instead of optical-electric converters.

Figure 1D:
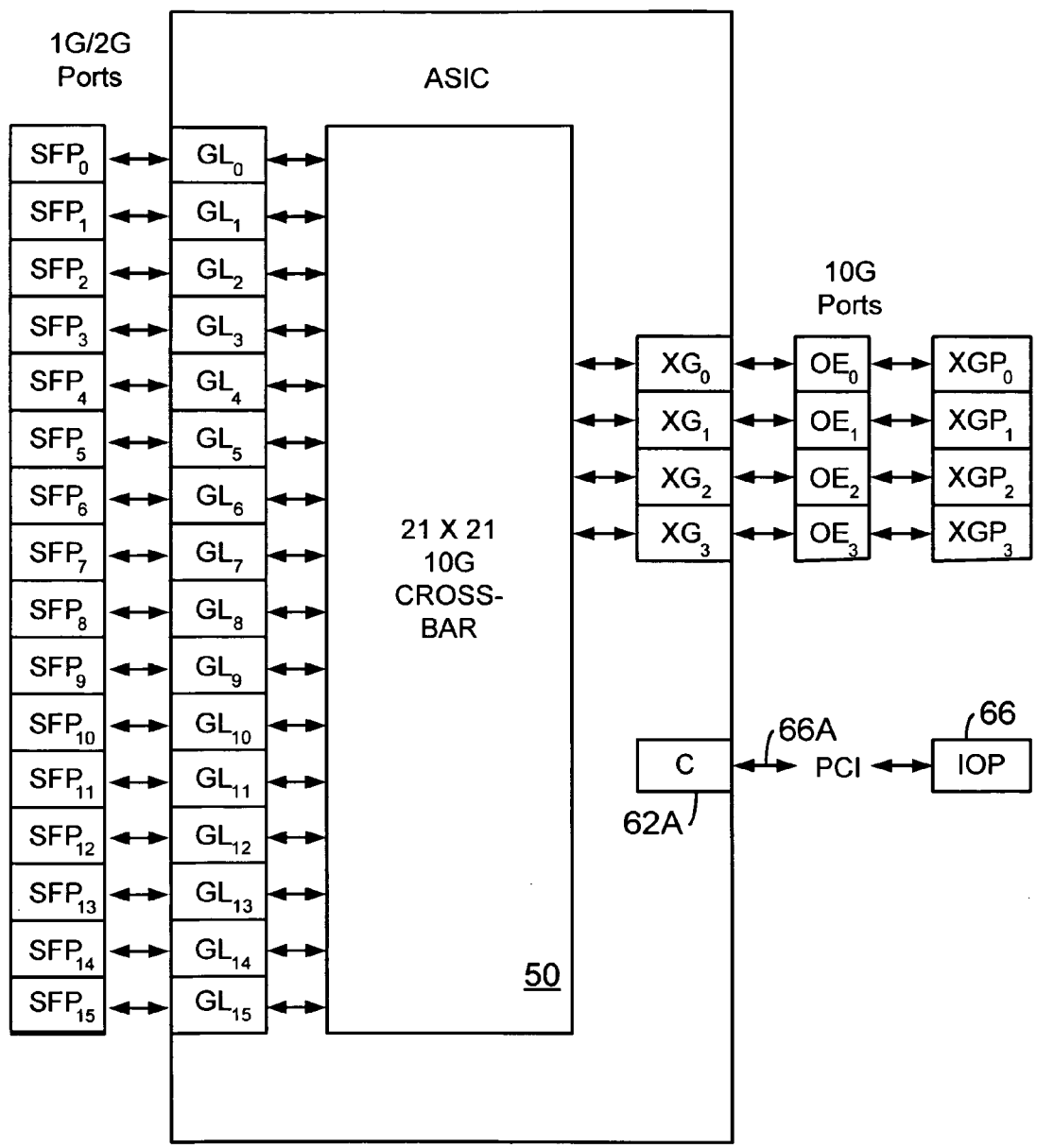
FIG. 1D shows a block diagram of a Fibre Channel switch element with sixteen GL_Ports and four 10G ports, according to one aspect of the present invention.

FIG. 1D shows a block diagram of ASIC 20 with sixteen GL ports and four 10G port control modules designated as XG0-XG3 for four 10G ports designated as XGP0-XGP3. ASIC 20 include control port 62A that is coupled to IOP 66 through a PCI connection 66A. Non-PCI connections may be used to couple IOP 66 to control port 62A.

FIGS. 1E(i)/1E(ii) (jointly referred to as FIG. 1E) show yet another block diagram of ASIC 20 with sixteen GL and four XG port control modules. Each GL port control module has a Receive port (RPORT) 69 with a receive buffer (RBUF) 69A (similar to 52, FIG. 1B) and a transmit port 70 with a transmit buffer (TBUF) 70A (similar to 54, FIG. 1B). GL and XG port control modules are coupled to physical media devices ("PMD") 76 and 75 respectively.

Control port module 62A includes control buffers 62B and 62D for transmit and receive sides, respectively. Control port module 62A also includes a PCI interface module 62C that allows interface with IOP 66 via PCI bus 66A.

XG_Port (for example 74B) includes receive port (RPORT) 72 with receive buffer (RBUF) 71 similar to Receive Port 69B and receive buffer (RBUF) 69A, respectively. Port 74B also includes transmit buffer (TBUF) 74 and transmit port (TPORT) 74A similar to TBUF 70A and transmit port 70, respectively. Protocol module 73 interfaces with SERDES to handle protocol based functionality.

Receive Port 69 via SERDES 68 receives incoming data packets and then transmitted using transmit port 70. Buffers 69A and 70A are used to stage data packets in the receive and the transmit path.

It is noteworthy that although the foregoing switch element descriptions have been described with respect to Fibre Channel standards, the adaptive aspects of the present invention are not limited to Fibre Channel supported network systems and apply to InfiniBand, SAS and other network standards.

Figure 1F:
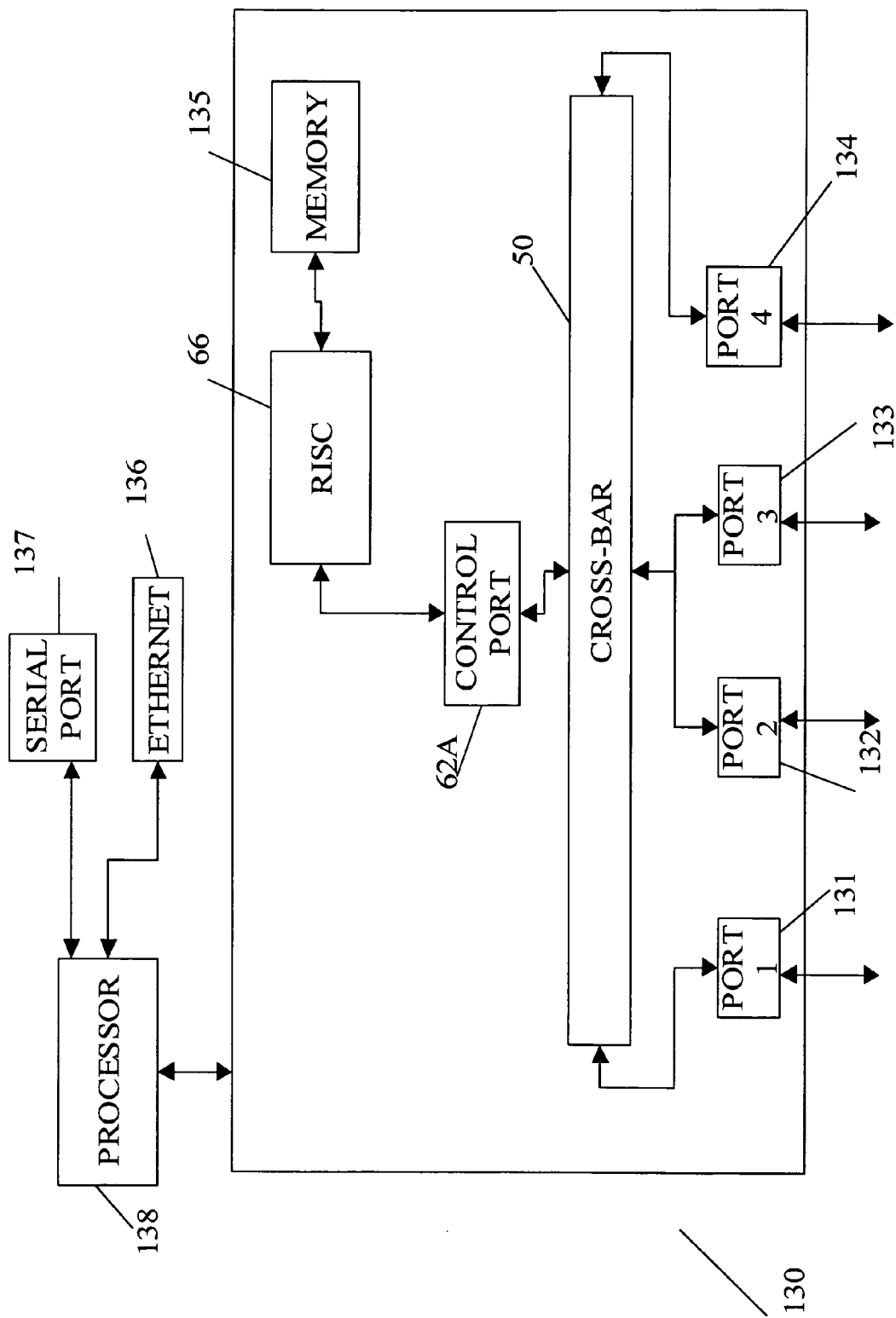
FIG. 1F shows a block diagram of a generic switch element, according to one aspect of the present invention.

FIG. 1F shows a block diagram of a generic network switch 130 that includes a processor (for example, a reduced instruction set computer ("RISC")) 66, which is operationally coupled to plural ports 131, 132, 133 and 134 via a control port 62A, and cross-bar 50. Processor 66 has access to memory 135 that may be used to store program instructions or other information used by processor 66.

Switch 130 may be coupled to a processor 138 that is coupled to Ethernet port 136 and serial port 137. In one aspect of the present invention, processor 138 may be a general-purpose processor.

Figure 1G:
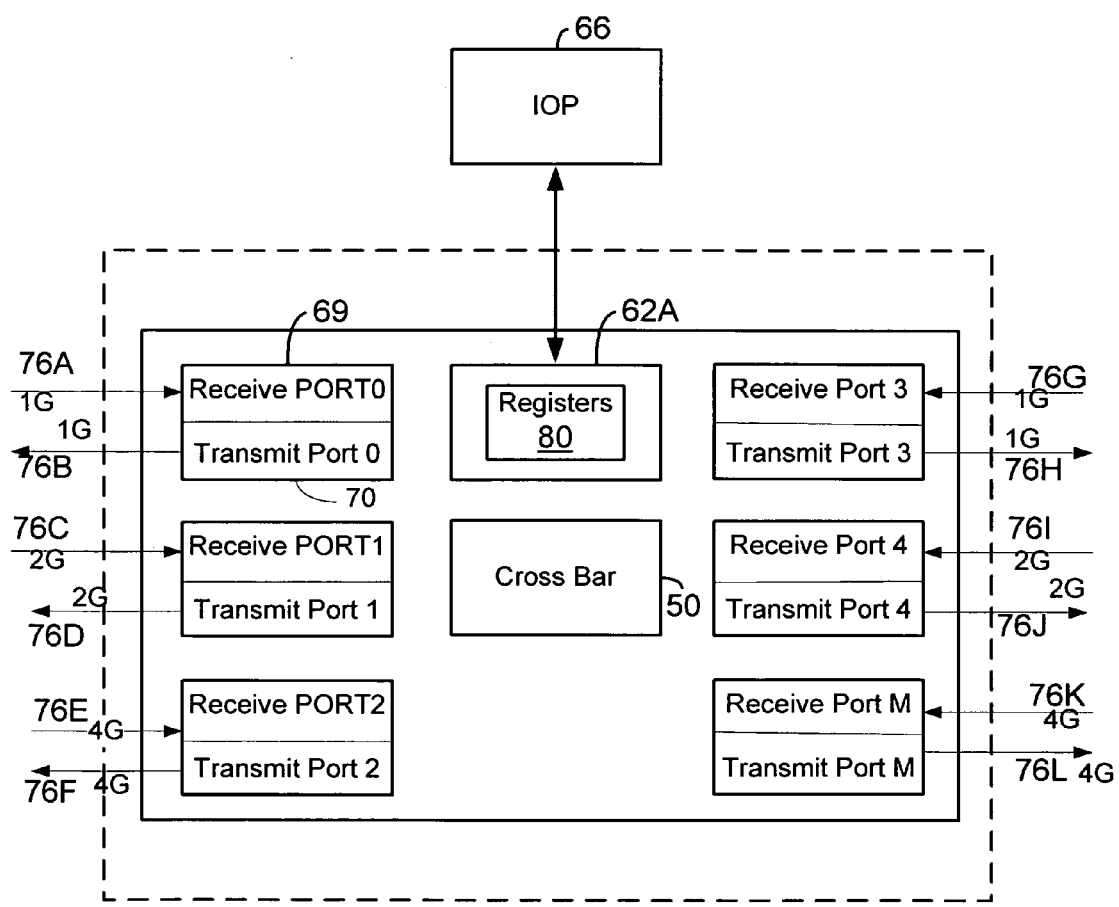
FIG. 1G shows a block diagram of a switch chassis, according to one aspect of the present invention.

FIG. 1G shows a top-level block diagram of a generic switch element with physical links and plural ports, according to one aspect of the present invention. Each port has a receive port 69 and transmit port 70. Plural receive ports (0-M) and transmit port 0-M are shown in FIG. 1G.

Each receive port may be coupled to physical links 76A, 76C, 76E, 76G, 76I, 76K, respectively. Each transmit port may be coupled to physical links 76B, 76D, 76F, 76H, 76J, and 76L. Physical link 76A may be an optical, copper or other link media. The link-rates may vary from 1G, 1.5G, 2G, 3G, 4G, 5G, 6G, 8G or others.

Control registers 80 located at control port 62A are accessible to processor 66. Control registers 80 are used to configure a switch element to transmit information in one of plural modes, according to one aspect of the present invention, as described below with respect to FIG. 1H.

Figure 1H:
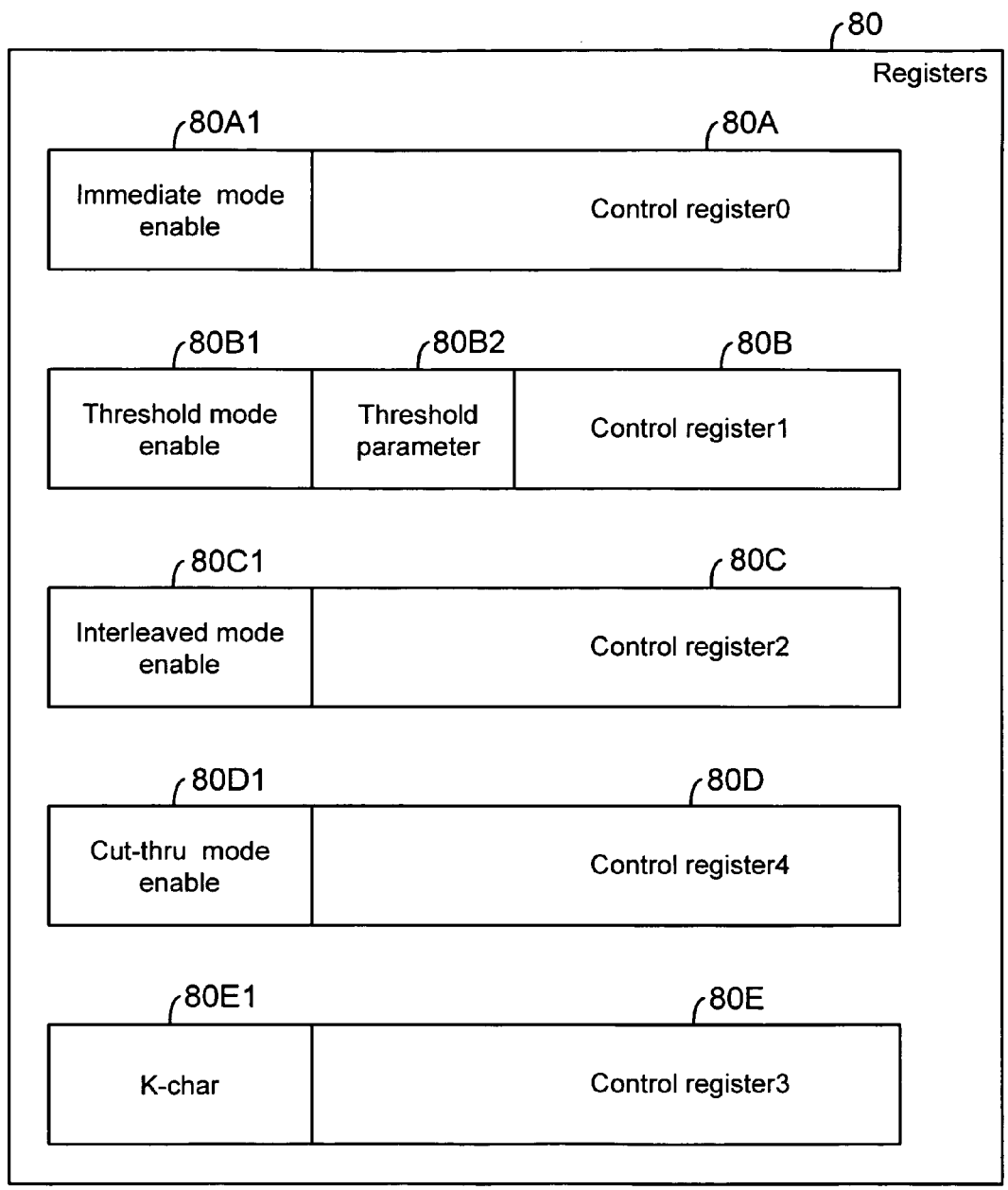
FIG. 1H shows control registers for enabling various modes to route network information, according to one aspect of the present invention.

Operational Mode Settings:

FIG. 1H shows plural registers within block 80 for enabling various modes to route data packets, according to one aspect of the present invention. Although more than one control register is shown, a single register with plural bits can be used to set-up the various modes described below.

A switch element may have a default mode setting, which may also be referred to as a "cut-through" mode. The "cut-through mode" may be enabled/disabled by setting a bit value (80D1). IOP 66 may be used to enable or disable cut-through mode by setting bit value 80D1. For example, a bit value of 1 may be used to indicate that cut-through mode is set and a bit value of 0 may be used to indicate that cut-through mode is disabled.

If cut through mode is set in control register 80D, then transmit port 70 waits until a part of the frame is received before transmitting data on the output physical link. IOP 66 may set cut through conditions.

Cut-through mode is also described in co-pending patent application, entitled "Method and System for Programmable Data Dependant Network Routing", Ser. No. 10/894,627, filed on Jul. 20, 2004, the disclosure of which is incorporated herein by reference.

Register 80A may be used to enable or disable an "immediate mode". A bit value (80A1) may be used to enable or disable this feature. IOP 66 may set the bit value to indicate if immediate mode is set. For example, a bit value of 1 indicates that immediate mode is set and a bit value of 0 indicates that immediate mode is disabled. When immediate mode is disabled cut-through based routing is used to match the rate difference between receive and transmit ports. If immediate mode is set in control register 80A, then transmit port transmits data immediately when a first part of a data packet is received by receive port 69.

When operating in the immediate mode, a transmit port (70) inserts fill words that may include unique characters, for example, a unique K character or any other uniquely identifiable value 80E1 defined in register 80E. The fill words are negotiated between a transmit port and a receive port. The negotiation is part of the port login process that takes place during link initialization. In another aspect, both ends of the link may use predefined fill word(s).

A "threshold mode" may be enabled/disabled by setting a bit value (80B1) in register 80B. IOP 66 may enable or disable the threshold mode. Threshold parameters (80B2) are stored in register 80B, based on which data packets are transferred. Threshold parameters 80B2 may be a percentage of a data packet's length, an absolute value of data packet, the number of data packets pending transmission or other parameters. The threshold mode may consider different link rates or other programmable values like quality of service (QOS) to transmit frames.

If threshold mode is set in control register 80B, then transmit port uses immediate and interleaved modes (as applicable) if enabled, and if threshold conditions are not met. If threshold mode is active and threshold conditions are met; a technique similar to cut-through routing is used for packet transmission. Threshold mode allows a link to be optimized for both low latency and high bandwidth by disabling immediate mode when the transmit links need more bandwidth.

Register 80C may be used to enable or disable an "interleave mode". A bit value (80C1) may be used to enable or disable this feature. IOP 66 may set the bit value to indicate whether interleave mode is enabled/disabled. For example, a bit value of 1 may be used to indicate that interleave mode is set and a bit value of 0 may be used to indicate that interleave mode is disabled. Interleave mode may be used on SAS links to allow multiple simultaneous connection to maximize link bandwidth.

If interleave mode and immediate mode is set and either the threshold mode is disabled or the threshold conditions are not met; then data packets are transmitted in an interleaved manner as described below with respect to FIG. 1J.

Figure 1I:
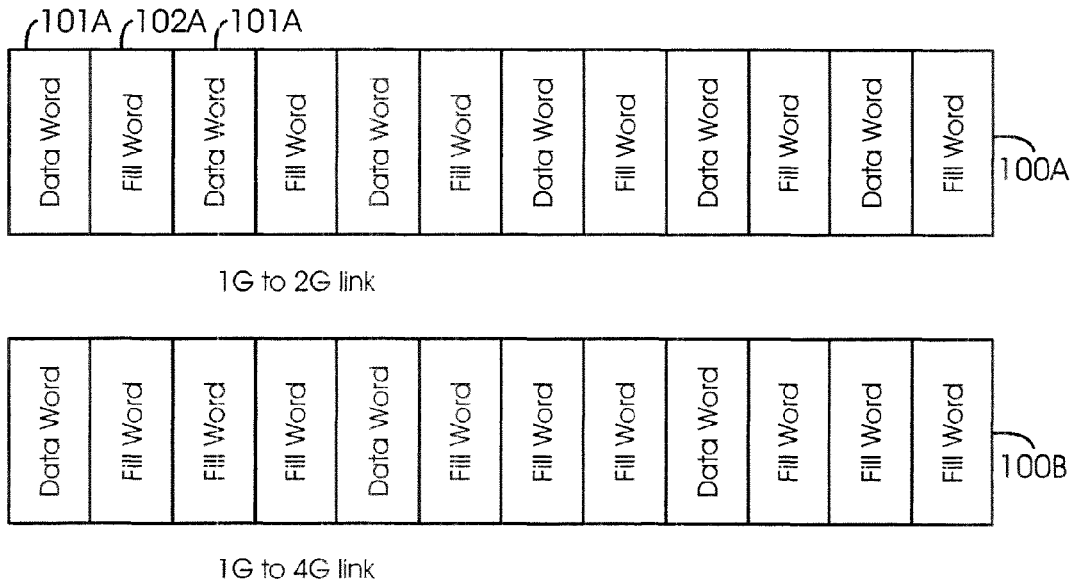
FIG. 1I, shows fill word insertion, according to one aspect of the present invention.

Fill Word Insertion in Immediate Mode:

FIG. 1I shows an example of fill word insertion, according to one aspect of the present invention. When the link-rate of a transmit port is greater than that of a receive port, then the transmit port can run out of data, if it starts transmitting immediately. In one aspect of the present invention, as shown in 100A, transmit port 70 inserts fill words 102A containing special or unique K character(s) or values (80E1) between Data Words 101A.

These special or unique K character(s) or values are negotiated between transmit port and receive port on the link. The negotiation is part of the port login process that takes place during switch initialization.

The number of inserted fill words will depend on the difference between the receive link and transmit link rates and the amount of the data buffered within switch element. For example, if a receive port 69 is coupled to a 1G link (76A) and a transmit port 70 is coupled to a 2G link (76C), then transmit port 70 inserts a fill word in between two Data Words 101A as shown in 100A. However, transmit port 70 inserts 3 fill words 102A after each data word 101A, if transmit port 70 is coupled to a 4G physical link (76E) as shown in 100B.

Figure 1J:
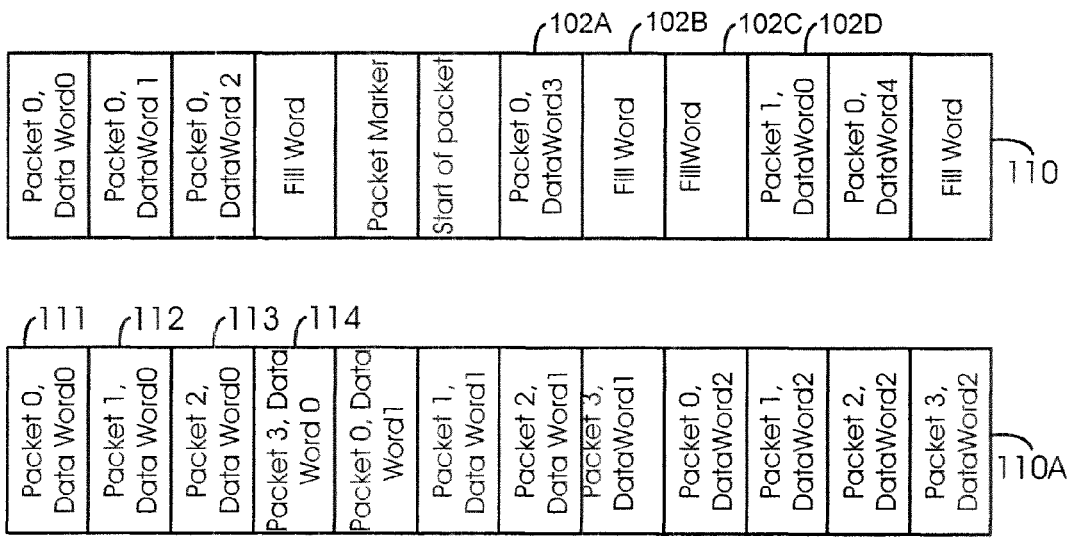
FIG. 1J, shows data packet interleaving in an immediate mode, according to one aspect of the present invention.

Interleaving:

FIG. 1J, shows data packet interleaving, according to one aspect of the present invention. Data packets are interleaved when immediate mode and interleave mode are enabled.

When plural receive ports receive plural data packets simultaneously at plural receive links (for example, 76A and 76G (FIG. 1G) at a link-rate of 1G; and if both data packets are destined to the same output transmit link (for example, 76D) transmitting at a higher link-rate (for example, 4G), then the data packets are interleaved during transmission.

Plural interleaved Data Words are shown in 110 in FIG. 1J. Transmit port 70 inserts fill words 102B and 102C between Packet 0 Data Word3 (102A) from receive link 76A and Packet 1 Data Word0 (102D) from receive link 76G. Similarly, if there are 4 data packets from four different receive ports destined to a single output transmit port, then the data packets are interleaved as shown in 110A.

In the example shown in 110A, Packet0 Data Word0 (111), Packet1 Dataword0 (112), Packet2 Data Word0 (113) and Packet3 Data Word0 (114) are Data Words from 4 different data packets received at plural receive ports. The transmit port interleaves data during transmission by transmitting Packet( ) Data Word0, Packet1 Data Word0, Packet2 Data Word0, Packet3 Data Word0 and Packet0 Data Word1 in that order. This sequence is repeated until all the Data Words of the received data packets are transmitted.

It is noteworthy that some or all of the data packets that are being interleaved could originate from memory storage and need not come directly from the respective receive links.

Figure 1K:
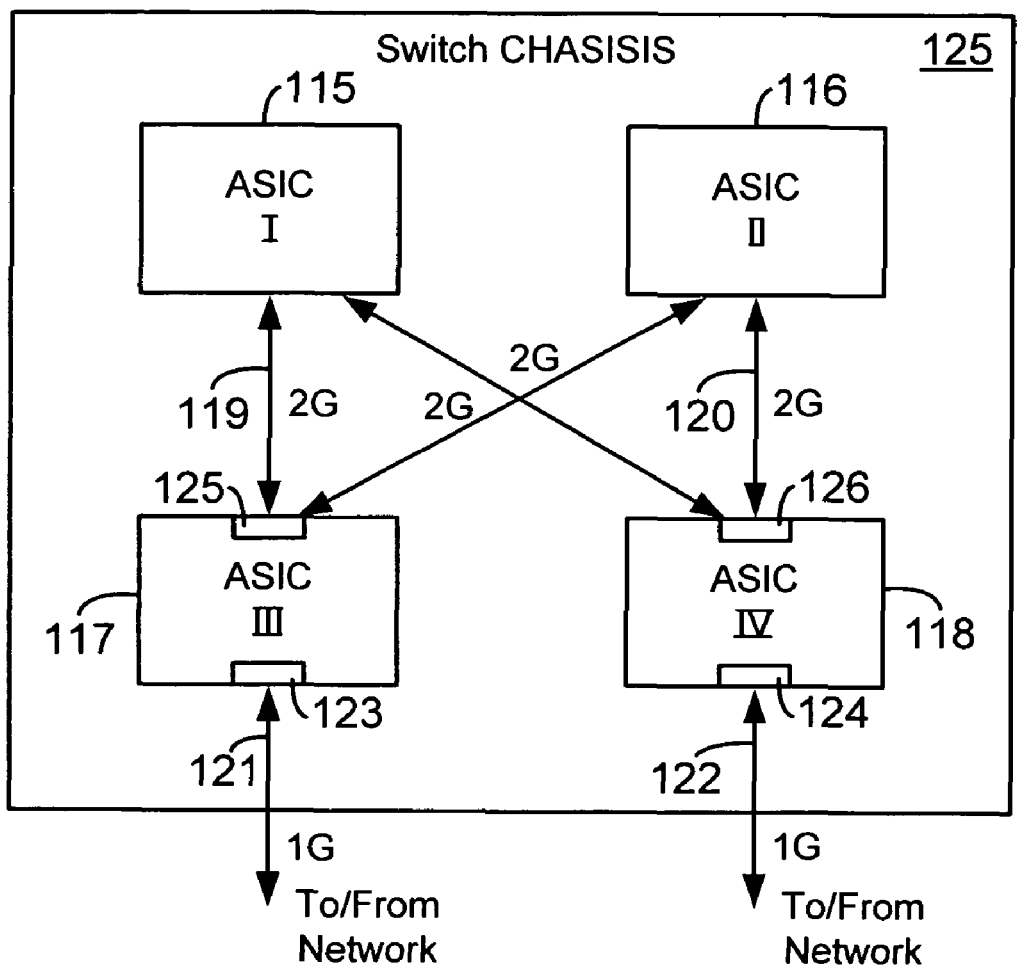
FIG. 1K shows a block diagram of a switch chassis, according to one aspect of the present invention.

FIG. 1K shows an example of a switch chassis 125 configuration that may use fill-words depending on switch element mode. Switch chassis 125 includes plural ASICs (switch elements) with plural ports. The ASICs may have a structure/layout similar to the switch elements described above. As an example, four ASICs have been shown (115, 116, 117 and 118).

ASICs 117 and 118 have user ports 123 and 124 and auxiliary ports 125 and 126. Ports 123 and 124 are used to interface with a network (via links 121 and 122), while auxiliary ports 125 and 126 are used to interface with ASICs 115 and 116. Links 119 and 120 are 2G while links to ports 123 and 124 are 1G. The ASICs of FIG. 1K may operate in plural modes, as described below with respect to FIGS. 2 and 3.

Figure 2I:
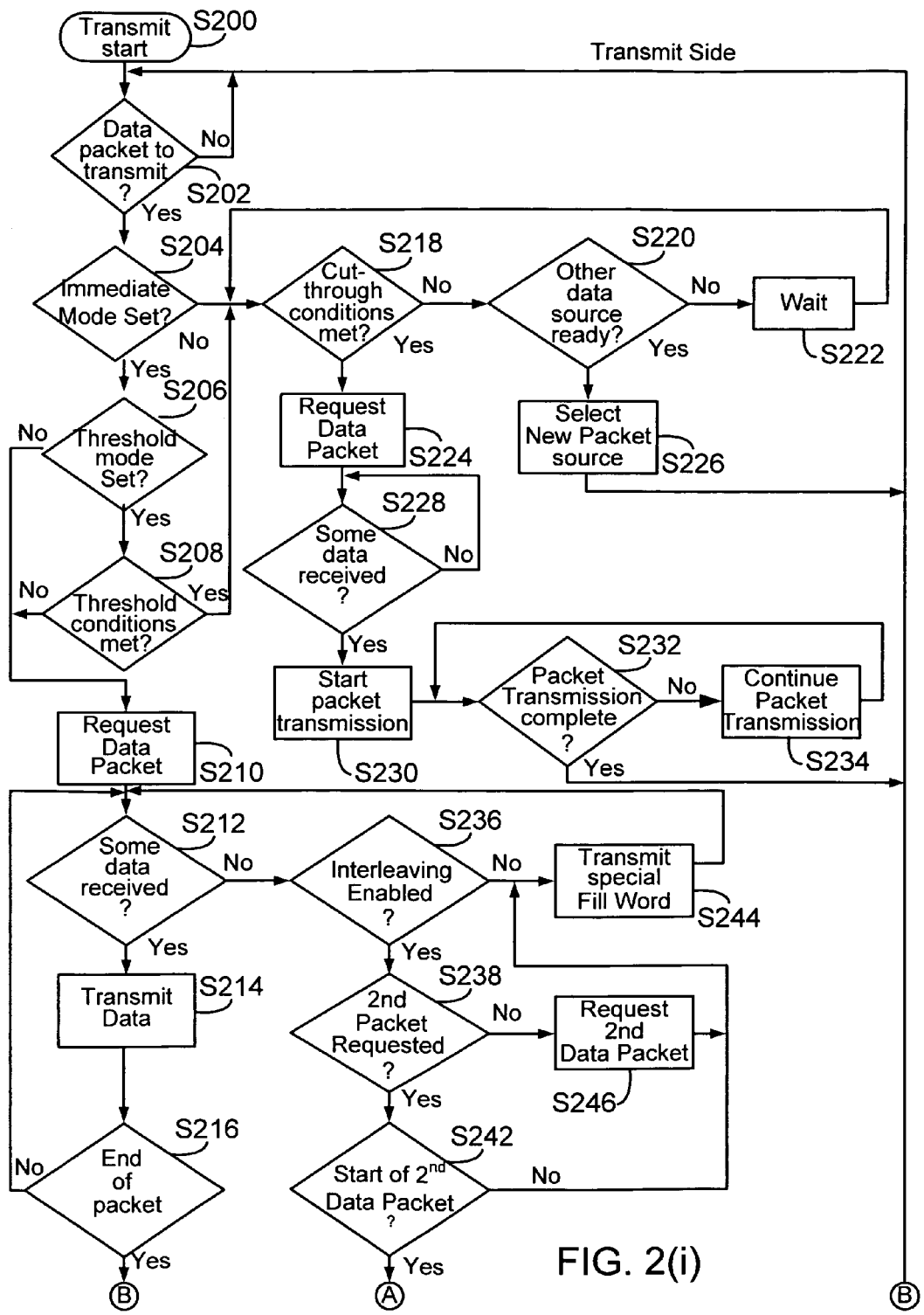
FIG. 2 shows a flow diagram for processing network information on a transmit side of a switch element, according to one aspect of the present invention.
Figure 2:
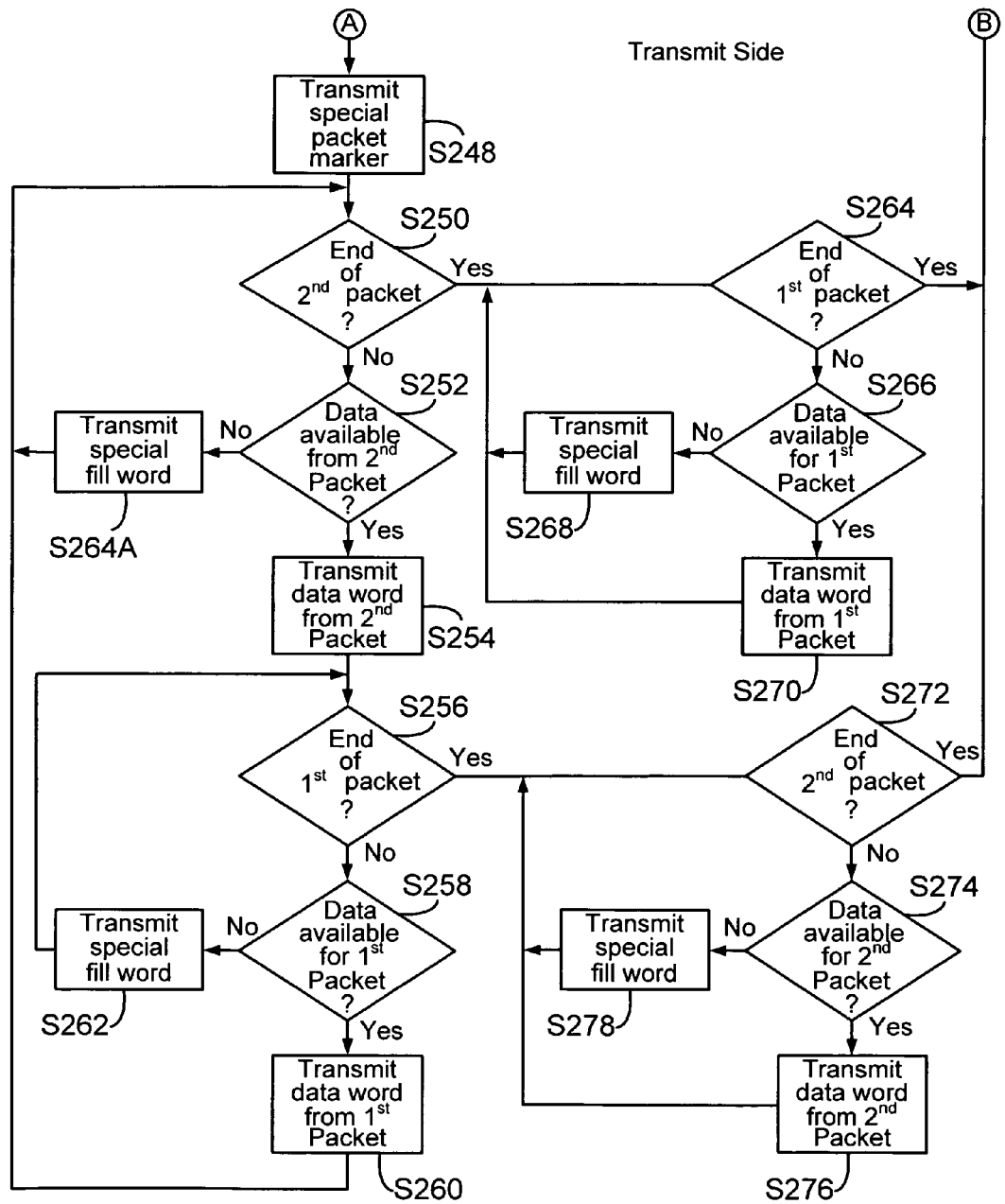

Process Flow:

FIG. 2 shows a top-level flow chart for routing a data packet from a transmit side of a Fibre Channel switch element, according to one aspect of the present invention. The process starts in step S200 and in step S202, a transmit port (70) determines if there are any data packets that need to be transmitted. If not, the process simply loops back, where a transmit port 70 waits.

If there are data packets that are waiting to be transmitted, then in step S204, the process determines if the immediate mode is set. As discussed above, setting a bit value in register 80A may set the immediate mode.

If immediate mode is not set (implying cut-through mode), then in step S218, transmit port 70 determines if the cut-through conditions are met, i.e., the appropriate fraction of a data packet has been received, the packet length, the number of other packets to transmit. If the conditions are not met, then in step S220, transmit port 70 determines if other data packet sources are ready. If not, then transmit port 70 simply waits in step S222. If another packet source is ready, then in step S226, transmit port 70 selects that source and the process moves back to step S202.

If cut-through conditions are met, then in step S224, the packet for transmission is requested. In step S228, transmit port 70 determines if some data has been received. If yes, then in step S230, transmit port 70 starts packet transmission. In step S232, transmit port 70 determines if transmission is complete. If yes, then the process moves back to step S202. If transmission is not complete, then in step S234, packet transmission continues.

If data has not been received in step S228, then transmit port 70 simply waits for the data to arrive.

If immediate mode was set in step S204, then in step S206, transmit port 70 determines if threshold mode is set. Using register 80B may set this mode.

If threshold mode is set, then in step S208, transmit port 70 determines if threshold conditions are met. If conditions are met, then the process moves to step S218.

If threshold mode is not set, then in step S210, transmit port 70 requests a data packet. In step S212, transmit port 70 determines if some data has been received. If yes, then data is transmitted in step S214 (immediate mode transmission). If an end of first packet has been received in step S216, then the process moves back to step S202. If an end of packet has not been received in step S216, then the process moves back to step S212.

If data has not been received in step S212, then in step S236, transmit port 70 checks to see if interleaving is enabled.

Setting a bit in register 80C may enable interleaving. If interleave mode is not enabled, then in step S244, transmit port 70 transmits a special fill word.

If interleaving is enabled, then in step S238, transmit port 70 determines if another data packet has been requested. If not, then in step S246, transmit port 70 requests a second data packet.

If a second data packet had been requested, then in step S242, transmit port 70 determines if a start of a second packet has been received. If not, then the process moves to step S244.

If yes, then a special packet marker is transmitted in step S248. The special marker is to distinguish between the first and second data packets. When this marker is received by the receive port on the link, the receive port is set into interleave mode. In another aspect of the present invention, no special marker is needed. The second start of packet (SOP) within another data packet serves the same purpose. In step S250, transmit port 70 determines if an end of the second packet has been reached. If yes, then in step S264, transmit port 70 determines if the end of the previous (or first) packet has been reached. If yes, the process moves back to step S202. If end of first packet is not reached, then in step S266, transmit port 70 determines if data is available for the first packet. If no data is available, then in step S268, a special fill-word is transmitted. If data is available for the first packet, then in step S270, data is transmitted and the process moves back to step S250.

If end of second packet is not reached in step S250, then in step S252, transmit port 70 determines if data is available for the second packet. If no data is available, then a special fill word is transmitted in step S264A and the process moves to step S250.

If data is available in step S252, then it is transmitted in step S254.

In step S256, transmit port 70 determines if the end of the first packet has been reached. If data is not available, then in step S258, transmit port 70 determines if data for the first packet is available. If not, then in step S262, a special fill word is transmitted and the process moves to step S256. If data is available for the first packet, then it is transmitted in step S260 and the process moves to step S256.

If end of first packet is reached in step S256, then in step S272, transmit port 70 determines if the end of the second packet has been reached. If yes, then the process moves back to step S202. If not, then in step S274, transmit port 70 determines if data is available for the second packet. If not, then a special fill word is transmitted in S278. If yes, then in step S276, data words for the second packet are transmitted and the process moves to step S272.

It is noteworthy that although the foregoing interleaving example, references a first and second packet, the present invention is not limited to any particular number of interleaved packets or the order in which packets are received.

Figure 3I:
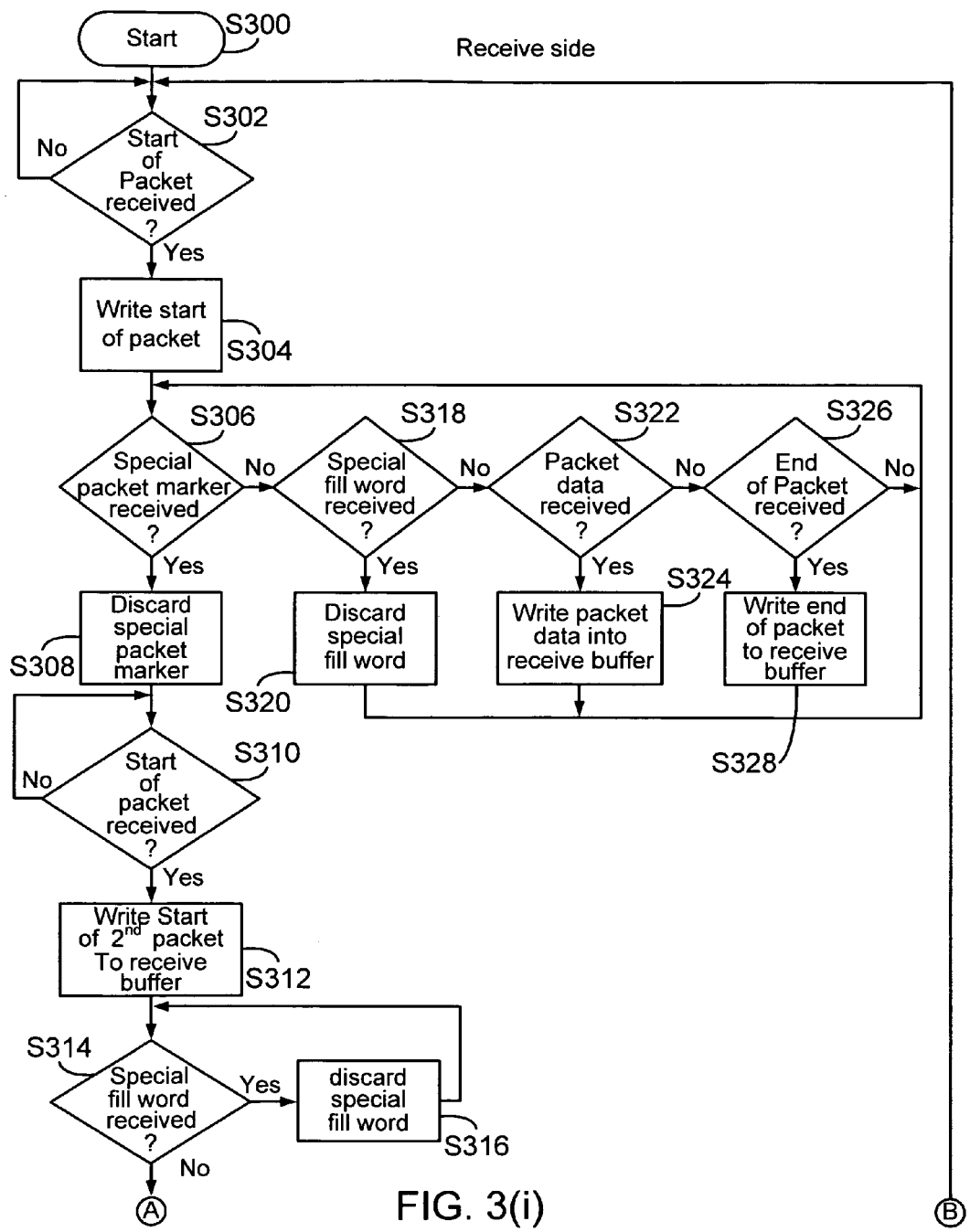
FIG. 3 shows a flow diagram for processing network information on a receive side of a switch element, according to one aspect of the present invention.
Figure 3:
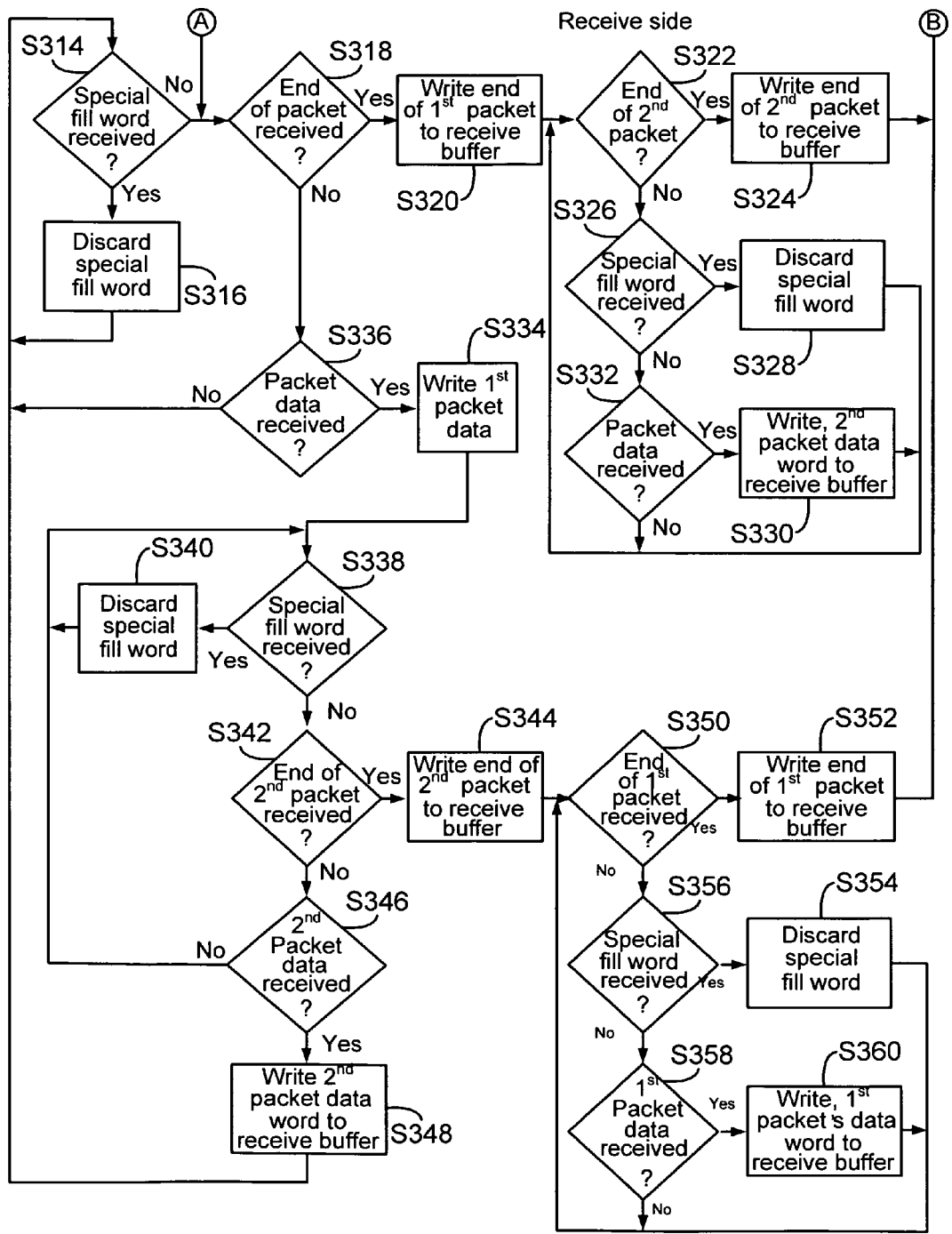

FIG. 3 shows a process flow diagram for processing data packets on the receive side, according to one aspect of the present invention. The process starts at step S300. In step S302, receive port 69 determines if a start of a first packet at any given time has been received. If not, the receive port 69 waits for the start of the packet.

If a start of the first packet is received, then in step S304, the start of first packet is written to a receive buffer.

In step S306, receive port 69 determines if a special packet marker has been received. If a special packet marker is not received, then in step S318, receive port 69 determines if a special fill word is received. If yes, then the fill word is discarded in step S320 and the process moves to step S306.

If a fill word is not received in step S318, then in step S322, receive port 69 determines if data associated with the first packet has been received. If yes, then in step S324, the data packet is written into a buffer and the process moves to step S306.

If data is not received in step S322, then in step S326, receive port 69 determines if the end of the first packet is received. If yes, then the end of packet is written into a buffer in S328 and the process moves to step S302. If end of packet is not received then the process moves to step S306.

If special packet marker is received in step S306, then the special marker is discarded in step S308. In step S310, receive port 69 determines if a start of a second packet is received. If no, the process waits at step S310. If yes, then in step S312, the start of second packet is written in a receive buffer.

In step S314, receive port 69 determines if a special fill word has been received. If yes, then the fill word is discarded in step S316 and the process moves back to step S314.

If a special fill word is not received, then in step S318, receive port 69 determines if end of first packet has been received. If yes, then in step S320, the end of first packet is written to a receive buffer.

In step S322, receive port 69 determines if the end of second packet has been received. If yes, then the end of second packet is written in step S324.

If end of second packet is not received in step S322, then in step S326, receive port 69 determines if special fill words have been received. If yes, then the fill words are discarded in step S328. If no fill word is received, then in step S332, receive port 69 determines if data for the second packet is received. If yes, then data is written to a buffer in step S330, other wise, the process moves back to step S328

If end of first packet is not received in step S318, then in step S336, receive port 69 determines if data for the first packet is received. If not, the process loops back to step S314. If data is received, then in step S334, data is written in a receive buffer.

In step S338, receive port 69 determines if a special fill word has been received. If yes, the fill word is discarded in step S340 and the process loops back to step S338.

If a special fill word is not received, then in step S342, receive port 69 determines if an end of second packet has been received. If not, then in step S346, receive port 69 determines if data for the second packet is received. If not, the process loops back to step S338. If yes, then in step S348, data is written in a receive buffer and the process moves back to step S314.

If end of second packet is received in step S342, then in step S344, the end of second packet is written to a receive buffer.

In step S350, receive port 69 determines if an end of first packet is received. If yes, then in step S352, the end of first packet is written in a receive buffer. If end of first packet is not received, then in step S356, receive port 69 determines if a special fill word has been received. If yes, then the fill word is discarded in step S354.

If a special fill word is not received, then in step S358, receive port 69 determines if data is received for the first packet. If yes, then data is written in a receive buffer in S360 and the process moves back to step S350. If data for first packet is not received in S358, process moves back to step S350.

According to one aspect of the present invention, transmitting data packets in the immediate mode reduces latency, thereby increasing the system performance.

According to yet another aspect of the present invention, interleaving mode enables multiple data packets to be transmitted simultaneously without delay, thereby utilizing the link bandwidth efficiently.

Although the present invention has been described with reference to specific embodiments, these embodiments are illustrative only and not limiting. Many other applications and embodiments of the present invention will be apparent in light of this disclosure and the following claims.

What is claimed is:

1. A switch element for routing network information using a network link, comprising:
   a receive port coupled to a receive link having a receive link rate;
   a transmit port coupled to a transmit link having a transmit link rate, the transmit link rate being greater than the receive link rate; and
   a programmable control system to configure the switch element to operate in a default mode, an immediate mode, a threshold mode and an interleave mode;
   wherein during the immediate mode, the transmit port inserts fill words with a unique character or unique characters between data words within a data packet when network information is not available, the number of inserted fill words depending upon a difference between the transmit link rate and the receive link rate, and the transmit port transmits network information immediately when a first part of a data packet is received by the receive port;
   wherein the fill words contain at least one K character, one unique K character, or a unique value and a standard K character; and
   wherein the unique character or unique characters are negotiated between the receive port and the transmit port during a port login process.

2. The switch element of claim 1, wherein the default mode is a cut-through mode and network information is transmitted in the cut-through mode, when a cut-through condition is met and if the immediate mode is disabled.

3. The switch element of claim 1, wherein if the threshold mode is enabled and if a threshold condition is not met, then the switch element uses the immediate mode and the interleave mode to transmit network information, if the immediate mode and the interleave mode are enabled.

4. The switch element of claim 1, wherein if the threshold condition is met and the threshold mode is enabled, then the transmit port uses default mode routing technique to route network information.

5. The switch element of claim 3, wherein the threshold condition is based on a threshold parameter stored in a control register.

6. The switch element of claim 5, wherein a control bit in the control register enables or disables the threshold mode.

7. The switch element of claim 1, wherein network information portions are interleaved, when the interleaved mode and the immediate mode are set; and if there is network information simultaneously waiting for delivery on plural receive ports destined for a single output port.

8. The switch element of claim 7, wherein a control bit in a control register enables or disables the interleave mode.

9. The switch element of claim 6, wherein the transmit port notifies the receive port before interleaving network information.

10. The switch element of claim 9, wherein the transmit port uses at least a unique K character; or a unique value and a standard K character to notify the receive port.

11. The switch element of claim 7, wherein data fill words are transmitted during packet interleaving.

12. The switch element of claim 1, wherein a control register with control bits is used to enable or disable the default mode, the immediate mode, the threshold mode and the interleave mode.

13. The switch element of claim 1, wherein the network link is a Fibre Channel Link.

14. The switch element of claim 1, wherein the network link is an Infiniband Link.

15. The switch element of claim 1, wherein the network link is a Serial Attached SCSI Link.

16. A method for transmitting network information via a switch element coupled to a network link, a transmit port of the switch element coupled to a transmit link having a transmit link rate, a receive port of the switch element coupled to a receive link having a receive link rate, the transmit link rate being greater than the receive link rate, the method comprising:
   determining if an immediate mode is enabled;
   if immediate mode is enabled, inserting fill words with a unique character or unique characters between data words within a data packet, if network information is unavailable, the number of inserted fill words depending upon a difference between the transmit link rate and the receive link rate, and transmitting the fill words and the data words to a network device; and
   wherein the fill words contain at least one K character, one unique K character, or a unique value and a standard K character;
   if immediate mode is enabled, transmitting network information immediately if network information is available and the threshold mode is either disabled or if a threshold condition is not met when a first part of a data packet is received by a receive port; and
   the receive port and the transmit port negotiating the unique character or unique characters during a port login process.

17. The method of claim 16, wherein a default cut-through mode is used to transmit network information, when a cut-through condition is met and if the immediate mode is disabled.

18. The method of claim 16, wherein if a threshold mode is enabled and if a threshold condition is not met, then the switch element uses the immediate mode and an interleave mode to transmit network information, if the immediate mode and the interleave mode are enabled.

19. The method of claim 16, wherein if a threshold condition is met and a threshold mode is enabled, then the switch element uses a cut-through routing technique to route network information.

20. The method of claim 18, wherein the threshold condition is based on a threshold parameter stored in a control register.

21. The method of claim 20, wherein a control bit in the control register enables or disables the threshold mode.

22. The method of claim 16, wherein portions of network information are interleaved, when an interleaved mode and the immediate mode are set; and if there is network information simultaneously waiting at plural receive ports destined for an output port.

23. The method of claim 22, wherein a control bit in a control register enables or disables the interleave mode.

24. The method of claim 22, wherein a transmit port notifies a receive port before interleaving network information.

25. The method of claim 24, wherein the transmit port uses at least a unique K character; or a unique value and a standard K character to notify the receive port.

26. The method of claim 22, wherein data fill words are transmitted during packet interleaving.

27. The method of claim 16, wherein a control register with control bits is used to enable or disable a default mode, the immediate mode, a threshold mode and an interleave mode for the switch element.

28. The method of claim 16, wherein the network link is a Fibre Channel Link.

29. The method of claim 16, wherein the network link is an Infiniband Link.

30. The method of claim 16, wherein the network link is a Serial Attached SCSI Link.

31. The switch element of claim 1, wherein each fill word has equal size.

32. The method of claim 16, wherein each fill word has equal size.

33. A switch element for routing network information using a network link, comprising:

a receive port coupled to a receive link having a receive link rate;

a transmit port coupled to a transmit link having a transmit link rate, the transmit link rate being greater than the receive link rate; and a control segment for configuring the switch element to operate in a default mode, an immediate mode, a threshold mode and an interleave mode, the control segment storing a unique character, which is a uniquely identifiable value that is negotiated between the receive port and the transmit port during a port login process that takes place during switch initialization;

wherein during the immediate mode, the transmit port inserts fill words with the unique character between data words within a data packet when network information is not available, the number of inserted fill words depending upon a difference between the transmit link rate and the receive link rate, and the transmit port transmits network information immediately when a first part of a data packet is received by the receive port;

wherein the fill words contain at least one K character, one unique K character, or a unique value and a standard K character.

* * * * *

UNITED STATES PATENT AND TRADEMARK OFFICE
CERTIFICATE OF CORRECTION

| | | |
|---|---|---|
| PATENT NO. | : 7,843,846 B1 | Page 1 of 1 |
| APPLICATION NO. | : 11/522672 | |
| DATED | : November 30, 2010 | |
| INVENTOR(S) | : Frank R. Dropps et al. | |

It is certified that error appears in the above-identified patent and that said Letters Patent is hereby corrected as shown below:

In column 7, line 65, delete "Packet( )" and insert -- Packet0 --, therefor.

In column 9, line 46, after "in" (first occurrence) insert -- step --.

Signed and Sealed this
Eighth Day of February, 2011

David J. Kappos
*Director of the United States Patent and Trademark Office*